(12) United States Patent
Yoneda

(10) Patent No.: US 7,567,278 B2
(45) Date of Patent: Jul. 28, 2009

(54) CIRCUIT AND METHOD FOR DETECTING PIXEL DEFECT

(75) Inventor: Masato Yoneda, Chiba (JP)

(73) Assignee: Sony Corporation, Tokyo (JP)

( * ) Notice: Subject to any disclaimer, the term of this patent is extended or adjusted under 35 U.S.C. 154(b) by 587 days.

(21) Appl. No.: 11/298,384

(22) Filed: Dec. 8, 2005

(65) Prior Publication Data
US 2006/0125939 A1  Jun. 15, 2006

(30) Foreign Application Priority Data
Dec. 9, 2004  (JP)  ............................. 2004-356473

(51) Int. Cl.
*H04N 9/64* (2006.01)
(52) U.S. Cl. ...................... 348/246; 348/247
(58) Field of Classification Search ......... 348/260–274, 348/246–247
See application file for complete search history.

(56) References Cited
U.S. PATENT DOCUMENTS
5,854,655 A * 12/1998 Watanabe et al. ........... 348/247
7,092,018 B1 * 8/2006 Watanabe ................... 348/247

* cited by examiner

Primary Examiner—Nhan T Tran
Assistant Examiner—Mekonnen Dagnew
(74) Attorney, Agent, or Firm—Sonnenschein Nath & Rosenthal LLP

(57) ABSTRACT

A circuit for detecting a pixel defect includes the following elements. A first defect detector compares a level of a target pixel signal on one horizontal pixel signal line of pixel signals input from an imaging device with levels of a plurality of surrounding pixel signals of the target pixel signal to determine whether or not a pixel corresponding to the target pixel signal is a possible defective pixel according to a comparison result. A second defect detector calculates a correlation between the detected possible defective pixel signal and the surrounding pixel signals to determines whether or not the possible defective pixel is a pseudo-defective pixel. A third defect detector performs the detection of the detected possible defective pixel on pixel signals in a predetermined number of frames, and determines that the pseudo-defective pixel is a true defective pixel when the pseudo-defective pixel is detected in all frames.

5 Claims, 3 Drawing Sheets

| 1 | | 2 | | 3 |
|---|---|---|---|---|
| | | | | |
| 4 | | target | | 5 |
| | | | | |
| 6 | | 7 | | 8 |

FIG. 2

| 1 | | 2 | | 3 |
|---|---|---|---|---|
| | | | | |
| 4 | | target | | 5 |
| | | | | |
| 6 | | 7 | | 8 |

CIRCUIT AND METHOD FOR DETECTING PIXEL DEFECT

CROSS REFERENCES TO RELATED APPLICATIONS

The present invention contains subject matter related to Japanese Patent Application JP 2004-356473 filed in the Japanese Patent Office on Dec. 9, 2004, the entire contents of which are incorporated herein by reference.

BACKGROUND OF THE INVENTION

1. Field of the Invention

The present invention relates to imaging devices. More specifically, the present invention relates to a pixel defect detecting circuit and method for use in solid-state imaging devices, such as charge-coupled devices (CCDs), for detecting pixel defects.

2. Description of the Related Art

Solid-state imaging devices, such as CCDs, typically detect and correct for image display errors, such as white defects. A white defect occurs such that a video signal region having a high signal level due to a crystal defect of a semiconductor device causes a higher brightness than an image portion therearound to bring a white pixel condition.

In a typical method for detecting image defects, when an image is picked up with uniform illumination (black or white), a pixel having the opposite pickup characteristics is detected as a defective pixel, and the address of the detected defective pixel is stored in a memory, such as an electrically erasable programmable read-only memory (EEPROM). The data corresponding to the defective pixel is interpolated from normal-characteristic data of pixels around the defective pixel. More specifically, as known in the art, uniform illumination (black) is obtained by shielding an imaging device from light, and a defect is detected. A pixel corresponding to a white defect signal on the screen that is completely shielded from light is detected as a defective pixel.

Another method for detecting defects is a real-time defect detection and correction method without using a memory, such as an EEPROM, as disclosed in Japanese Unexamined Patent Application Publication No. 2004-64512. In this method, a defect is dynamically detected in one frame from information of pixels around a target pixel, and the detected defective pixel is corrected within the same frame. This method allows detection and correction for up to an infinite number of defective pixels without a memory, and also allows more rapid detection and correction than detection of defects across frames.

SUMMARY OF THE INVENTION

However, the former method needs an inspection step of illuminating an imaging device with uniform illumination at the time of inspection during manufacturing, and the production cost therefore increases. Furthermore, a new pixel defect due to aged deterioration after the product is delivered to the customer is not addressed because the address of the defective pixel is not stored in the EEPROM.

The latter method allows automatic detection and correction for pixel defects to provide a simple inspection step, and also addresses the problem with aged deterioration. Moreover, an expensive memory, such as an EEPROM, is not needed. However, a line memory for holding a plurality of horizontal pixel signal lines that are delayed by steps of one horizontal period (H) is needed to compare a detected defective pixel with pixels around the defective pixel, and a memory capacity enough to hold comparison results is also needed. Thus, the complexity of the circuit arrangement increases.

It is therefore desirable to provide a pixel defect detecting circuit and method for automatically detecting a defective pixel of an imaging device with a simple and low-cost circuit arrangement.

A circuit for detecting a pixel defect according to an embodiment of the present includes the following elements. A first defect detecting portion detects a possible defective pixel by comparing a level of a target pixel signal on one horizontal pixel signal line of pixel signals input from an imaging device with levels of a plurality of surrounding pixel signals located to the right and left of the target pixel signal and determining whether or not a pixel corresponding to the target pixel signal is a possible defective pixel according to a comparison result. Second defect detecting portion detects a pseudo-defective pixel by calculating a correlation between the detected possible defective pixel signal and the surrounding pixel signals and determining whether or not the possible defective pixel is a pseudo-defective pixel according to the correlation. A third defect detecting portion detects a true defective pixel by performing the detection of the detected possible defective pixel as a pseudo-defective pixel on pixel signals in a predetermined number of frames and determining that the pseudo-defective pixel is a true defective pixel when the number of times the pseudo-defective pixel has been detected is equal to the predetermined number of frames.

A method for detecting a pixel defect according to another embodiment of the present invention includes the steps of comparing a level of a target pixel signal on one horizontal pixel signal line of pixel signals input from an imaging device with levels of a plurality of surrounding pixel signals located to the right and left of the target pixel signal, performing possible defective pixel detection by determining whether or not a pixel corresponding to the target pixel signal is a possible defective pixel according to a comparison result, calculating a correlation between the detected possible defective pixel signal and the surrounding pixel signals, determining whether or not the possible defective pixel is a pseudo-defective pixel according to the correlation, performing the detection of the detected possible defective pixel as a pseudo-defective pixel on pixel signals in a plurality of frames, and determining that the pseudo-defective pixel is a true defective pixel when the pseudo-defective pixel is detected in all frames.

According to an embodiment of the present invention, therefore, first, pixel signals on one horizontal line are input from an imaging device, and, then, a level of a target pixel signal is compared with levels of a plurality of surrounding pixel signals located to the right and left of the target pixel signal. If a difference between the levels is higher than a threshold value, the pixel corresponding to the target pixel signal is detected as a possible defective pixel, and the address of the detected possible defective pixel is held. After holding the levels of the detected possible defective pixel signal and the surrounding pixel signals from the pixel signals in the next frame, a correlation between the possible defective pixel signal and the surrounding pixel signals is calculated. If the correlation is not found, the possible defective pixel is detected as a pseudo-defective pixel, and the detection of the pseudo-defective pixel is performed for a predetermined number of frames. If the number of times the pseudo-defective pixel has been detected is equal to the predetermined number of frames, the pseudo-defective pixel is detected as a true defective pixel. A line memory having a capacity for holding at least one horizontal line of pixel signals, and a memory having a capacity for holding at least an address of a possible defective pixel and signal levels of, for example, nine pixel signals including a possible defective pixel signal and surrounding pixel signals of the possible defective pixel signal are needed. It is therefore possible to detect pixel defects of an imaging device with simple, low-cost circuitry. Moreover, three detection steps of detecting a possible defective pixel, detecting a pseudo-defective pixel, and detecting a true defective pixel allow high-accuracy detection of pixel defects.

BRIEF DESCRIPTION OF THE DRAWINGS

FIG. 2 is a diagram showing an exemplary pixel arrangement corresponding to a three by three pixel signal array held in a memory shown in FIG. 1.

DESCRIPTION OF THE PREFERRED EMBODIMENTS

A pixel defect of an imaging device is automatically detected with simple, low-cost circuitry in the following way. Pixel signals on one horizontal line are input from the imaging device, and a level of a target pixel signal is compared with levels of a plurality of surrounding pixel signals located to the right and left of the target pixel signal. If a difference between the levels is higher than a threshold value, the pixel corresponding to the target pixel signal is detected as a possible defective pixel, and the address of the detected possible defective pixel is held. After holding the levels of the detected possible defective pixel signal and the surrounding pixel signals from the pixel signals in the next frame, a correlation between the possible defective pixel signal and the surrounding pixel signals is calculated. If the correlation is not found, the possible defective pixel is detected as a pseudo-defective pixel, and the detection of the pseudo-defective pixel is performed for a predetermined number of frames. If the number of times the pseudo-defective pixel has been detected is equal to the predetermined number of frames, the pseudo-defective pixel is detected as a true defective pixel.

Figure 1:
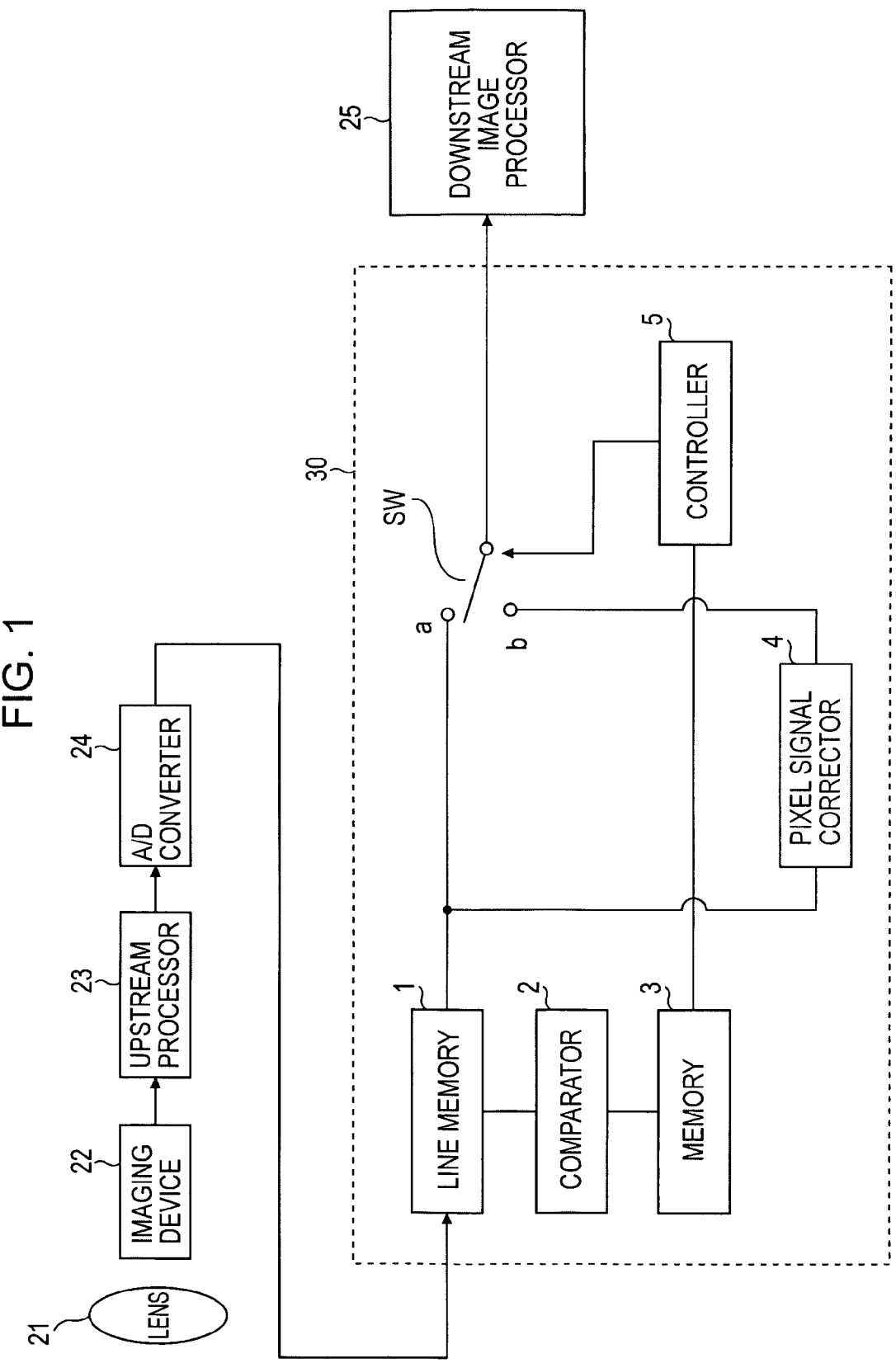
FIG. 1 is a block diagram showing a configuration of a pixel defect detecting circuit according to an embodiment of the present invention.

FIG. 1 is a block diagram showing a configuration of a pixel defect detecting circuit 30 according to an embodiment of the present invention. The pixel defect detecting circuit 30 is incorporated in a solid-state imaging device that includes a lens 21, an imaging device 22, an upstream processor 23, an analog-to-digital (A/D) converter 24, and a downstream image processor 25. The pixel defect detecting circuit 30 includes a line memory 1 that holds pixel signals on one horizontal line, a comparator 2 that compares the pixel signals held in the line memory 1, a memory (e.g., a register) 3 that holds comparison results of the comparator 2 and a three by three pixel signal array, a pixel signal corrector 4 that corrects a defective pixel signal to an average-level signal of surrounding pixels of the defective pixel, and a controller 5. The controller 5 is adapted to control a changeover switch circuit SW to output the pixel signal read from the line memory 1 or the pixel signal corrected by the pixel signal corrector 4 to the downstream image processor 25. The controller 5 is also adapted to calculate a correlation between the defective pixel signal and the surrounding pixel signals.

An operation of the solid-state imaging device will now be described. The imaging device 22 photoelectrically converts incoming light from the lens 21, and the upstream processor 23 performs processing, such as black level adjustment or gain loading, on the converted electrical signal. The analog image signal output from the upstream processor 23 is converted into a digital image signal by the A/D converter 24, and is then input to the line memory 1 of the pixel defect detecting circuit 30.

The comparator 2 compares a target pixel signal for inspection on one horizontal image signal line that is held in the line memory 1 with a plurality of pixel signals located to the right and left of the target pixel signal. When the level difference between the pixel signals is higher than a predetermined level, the comparator 2 determines that the target pixel signal on this line is a possible defective point, and temporarily writes the address of this point to the memory 3.

Figure 2:
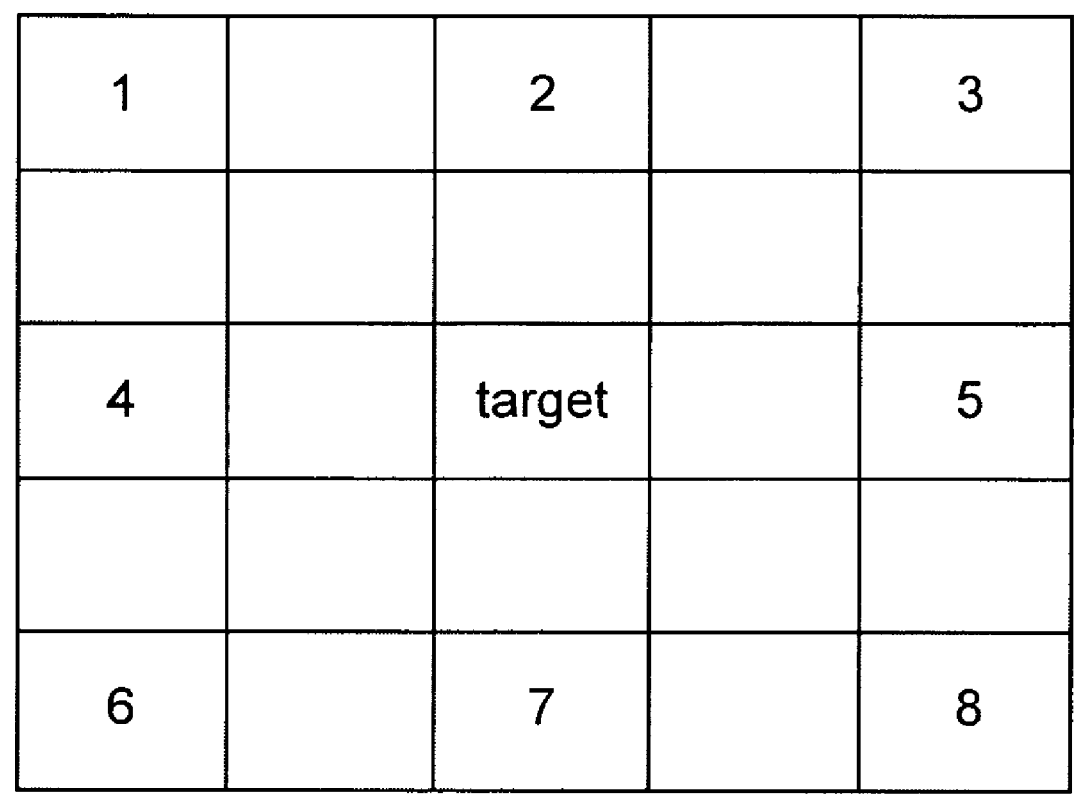

After performing pixel defect detection for one frame, the defect detection is performed for the next frame. Since the possible defective point is known at this time, levels of the pixel signal at the possible defective point and the three by three surrounding pixel signals, shown in FIG. 2, are held in the memory 3. The controller 5 calculates a correlation between the level of the pixel signal at the possible defective point and the levels of the surrounding pixel signals. If the correlation exceeds a predetermined level to cause an error, the pixel at the possible defective point is detected as a pseudo-defective pixel, and the address of the detected pixel is stored in the memory 3. In FIG. 2, a "target" pixel represents the possible defective pixel, and pixels 1 to 8 represent the surrounding pixels. A correlation between the pixel signal levels is calculated from the "target" pixel and the surrounding pixels 1 to 8.

A correlation between the pixel at the possible defective point and surrounding pixels of the pixel is calculated for a plurality of frames. If the pseudo-defective pixel is detected in all frames, the controller 5 switches the changeover switch circuit SW from a terminal a to a terminal b to output the signal output from the pixel signal corrector 4 to the downstream image processor 25 so that the image signal at the address of the pseudo-defective pixel is replaced by a normal-level image signal. With respect to a signal of a non-defective pixel, the controller 5 sets the changeover switch circuit SW to the terminal a to output the pixel signal from the line memory 1 to the downstream image processor 25.

Figure 3:
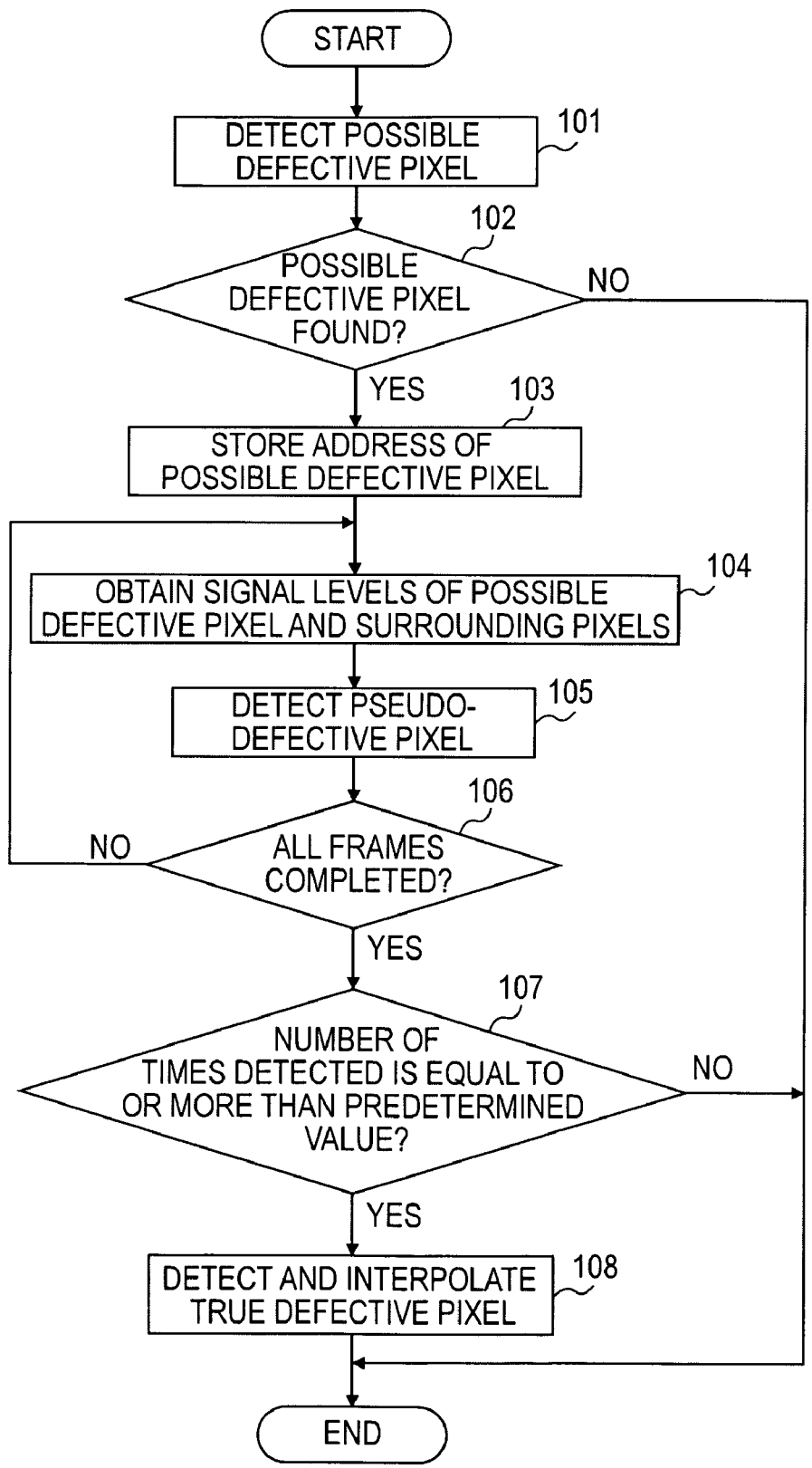
FIG. 3 is a flowchart showing an operation of the pixel defect detecting circuit shown in FIG. 1 to detect a pixel defect.

FIG. 3 is a flowchart showing an operation of the pixel defect detecting circuit 30 shown in FIG. 1 to detect a pixel defect. In step 101, pixel defect detection processing for one frame is performed on every 1H horizontal image signals to detect a possible defective pixel. After performing the pixel defect detection processing for one frame, in step 102, it is determined whether or not a possible defective pixel is found. If no possible defective pixel is found, the pixel defect detection flow end.

If a possible defective pixel is found, then, in step 103, the address of the possible defective pixel is held in the memory 3. In step 104, the signal levels of the possible defective pixel and surrounding pixels of the possible defective pixel are obtained with respect to the horizontal pixel signals in the next frame, and are held in the memory 3. In step 105, a correlation between the possible defective pixel signal and the surrounding pixel signals is calculated, and it is determined that the possible defective pixel is a pseudo-defective pixel when the correlation exceeds a predetermined level to cause an error (in a case where there is no correlation).

This pseudo-defective-pixel detection (the processing of steps 104 and 105) is performed for a predetermined number of frames. In step 106, if it is determined that the pseudo-defective-pixel detection has been performed for the predetermined number of frames, then, in step 107, it is determined whether or not the possible defective pixel has been detected in all frames as a pseudo-defective pixel. If the possible defective pixel has not been detected in all frames, the pixel defect detection flow ends. If it is determined in step 106 that the pseudo-defective-pixel detection has not been performed for the predetermined number of frames, the flow returns to step 104. If the possible defective pixel has been detected in all frames, then, in step 108, it is determined that the pseudo-defective pixel is a true defective pixel, and an interpolated pixel signal is output in place of the defective pixel signal read from the defective pixel. Then, the flow ends.

According to this embodiment, an arrangement including the line memory 1 capable of holding pixel signals on one horizontal line and the memory 3 having a capacity capable of holding an address of a possible defective pixel and signal levels of the possible defective pixel and surrounding pixels of the possible defective pixel allows detection of pixel defects of the imaging device 22. It is therefore possible to detect pixel defects with simple and low-cost circuitry.

In the above-described pixel defect detecting method, first, a possible defective pixel in one frame is determined, and, then, it is determined that the possible defective pixel is a pseudo-defective pixel if the correlation between the possible defective pixel and surrounding pixels of the possible defective pixel has an abnormal value. This pseudo-defective-pixel detection is performed for a predetermined number of frames. If the pseudo-defective pixel is detected in all frames, it is determined that the pseudo-defective pixel is a true defective pixel, and the true defective pixel is interpolated. It is therefore possible to detect a defective pixel with high accuracy, and to prevent any deterioration or destruction of the image due to detection errors.

It is also possible to automatically detect pixel defects, thus providing a simple inspection step in the manufacturing process of products, such as digital cameras, and to reduce the production cost of the products. Moreover, the pixel defect detection is performed when the products are turned on after the products are delivered to customers, thus addressing the aged deterioration problem of the pixels of the imaging device 22.

It is to be noted that the present invention is not limited to the above-described embodiment and can be implemented in a variety of forms of specific structures, functions, effects, and advantages without departing from the scope of the invention. Any apparatus other than a digital camera that is adapted to process an image captured with an imaging device may implement the present invention to achieve similar advantages to those mentioned above.

According to an embodiment of the present invention, pixel signals on one horizontal line are input from an imaging device, and a level of a target pixel signal is compared with levels of a plurality of surrounding pixel signals located to the right and left of the target pixel signal. If a difference between the levels is higher than a threshold value, the pixel corresponding to the target pixel signal is detected as a possible defective pixel, and the address of the detected possible defective pixel is held. After holding the levels of the detected possible defective pixel signal and the surrounding pixel signals from the pixel signals in the next frame, a correlation between the possible defective pixel signal and the surrounding pixel signals is calculated. If the correlation is not found, the possible defective pixel is detected as a pseudo-defective pixel, and the detection of the pseudo-defective pixel is performed for a predetermined number of frames. If the number of times the pseudo-defective pixel has been detected is equal to the predetermined number of frames, the pseudo-defective pixel is detected as a true defective pixel. It is therefore possible to automatically detect pixel defects of the imaging device with simple, low-cost circuitry.

The automatic defect detection provides a simple inspection step in the manufacturing process of products, and reduces the production cost of the products. Moreover, the defect detection can be performed when the products are turned on after the products are delivered to customers, thus addressing the aged deterioration problem of the pixels of the imaging device.

It should be understood by those skilled in the art that various modifications, combinations, sub-combinations and alterations may occur depending on design requirements and other factors insofar as they are within the scope of the appended claims or the equivalents thereof.

What is claimed is:

1. A circuit for detecting a pixel defect, comprising:
a first defect detecting portion configured (a) to receive signals from an imaging device and to detect a possible defective pixel in the imaging device by comparing a level of a target pixel signal on one horizontal pixel signal line of pixel signals received from the imaging device with levels of a plurality of surrounding pixel signals on the same horizontal pixel signal line located on both sides of the target pixel signal, and (b) to determine whether a pixel corresponding to the target pixel signal is a possible defective pixel according to a comparison result;
a second defect detecting portion configured to detect a pseudo-defective pixel by calculating a correlation between the detected possible defective pixel signal and the surrounding pixel signals and determining whether or not the possible defective pixel is a pseudo-defective pixel according to the correlation; and
a third defect detecting portion configured to detect a true defective pixel by performing the detection of the detected possible defective pixel as a pseudo-defective pixel on pixel signals in a predetermined number of frames and determining that the pseudo-defective pixel is a true defective pixel when the number of times the pseudo-defective pixel has been detected is equal to the predetermined number of frames,
wherein,
the first defect detecting portion performs the detection of the possible defective pixel on pixel signals in one frame and the second defect detecting portion performs the detection of the pseudo-defective pixel on pixel signals in a different frame, and
the first, second and third detector portions share a line memory storing said horizontal pixel signal line.

2. The pixel defect detecting circuit according to claim 1, further comprising interpolating portion for replacing a pixel signal corresponding to the true defective pixel detected by the a third defect detecting portion with a pixel signal having a normal level and outputting the replaced pixel signal.

3. A method for detecting a pixel defect, comprising the steps of:
comparing a level of a target pixel signal on one horizontal pixel signal line of pixel signals input from an imaging device with levels of a plurality of surrounding pixel signals on the same horizontal pixel signal line located to the right and left of the target pixel signal;

performing possible defective pixel detection by determining whether or not a pixel corresponding to the target pixel signal is a possible defective pixel according to a comparison result;

calculating a correlation between the detected possible defective pixel signal and the surrounding pixel signals;

determining whether or not the possible defective pixel is a pseudo-defective pixel according to the correlation;

performing the detection of the detected possible defective pixel as a pseudo-defective pixel on pixel signals in a plurality of frames; and determining that the pseudo-defective pixel is a true defective pixel when the pseudo-defective pixel is detected in all frames, wherein, the step of comparing the level of the target pixel signal and the step of performing possible defective pixel detection are performed on the pixel signals in one frame and the step of calculating the correlation and the step of determining whether or not the possible pixel is the pseudo-defective pixel are performed on pixel signals in a different frame, and said first, second and third detecting steps are performed using one line memory in which said horizontal signal line is stored.

4. The pixel defect detecting method according to claim 3, further comprising a step of, when a true defective pixel is detected, replacing a pixel signal corresponding to the true defective pixel with a pixel signal having a normal level and outputting the replaced pixel signal.

5. A circuit for detecting a pixel defect, comprising:

a first defect detector configured to detect a possible defective pixel by comparing a level of a target pixel signal on one horizontal pixel signal line of pixel signals input from an imaging device with levels of a plurality of surrounding pixel signals on the same horizontal pixel signal line located to the right and left of the target pixel signal and determining whether or not a pixel corresponding to the target pixel signal is a possible defective pixel according to a comparison result;

a second defect detector configured to detect a pseudo-defective pixel by calculating a correlation between the detected possible defective pixel signal and the surrounding pixel signals and determining whether or not the possible defective pixel is a pseudo-defective pixel according to the correlation; and a third defect detector configured to detect a true defective pixel by performing the detection of the detected possible defective pixel as a pseudo-defective pixel on pixel signals in a predetermined number of frames and determining that the pseudo-defective pixel is a true defective pixel when the number of times the pseudo-defective pixel has been detected is equal to the predetermined number of frames, wherein, the first defect detecting portion performs the detection of the possible defective pixel on pixel signals in one frame and the second defect detecting portion performs the detection of the pseudo-defective pixel on pixel signals in a different frame, and said first, second and third detecting portions share a line memory in which said horizontal pixel signal line is stored.

* * * * *